United States Patent
Kitten et al.

(10) Patent No.: US 6,191,503 B1
(45) Date of Patent: Feb. 20, 2001

(54) COMPUTER WITH A CHASSIS INTRUSION DETECTOR

(75) Inventors: Gary Kitten; Ajay Kwatra, both of Austin, TX (US)

(73) Assignee: Dell USA, L.P., Round Rock, TX (US)

(*) Notice: Under 35 U.S.C. 154(b), the term of this patent shall be extended for 0 days.

(21) Appl. No.: 09/268,771

(22) Filed: Mar. 15, 1999

(51) Int. Cl.[7] .................................................. H02J 9/00
(52) U.S. Cl. .............................. 307/112; 340/541; 307/64
(58) Field of Search ........................... 340/541, 545.6, 340/635, 653; 307/64, 65, 66, 112; 200/61.62, 61.71, 61.72, 61.73, 61.74, 61.76, 61.81, 573

(56) References Cited

U.S. PATENT DOCUMENTS

| | | |
|---|---|---|
| 4,841,283 | 6/1989 | Bubliewicz . |
| 5,398,798 | 3/1995 | Ericson . |
| 5,746,459 | 5/1998 | Giroux, Jr. et al. . |
| 5,912,621 | * 6/1999 | Schmidt ................................ 340/571 |
| 5,945,915 | * 8/1999 | Cromer et al. ..................... 340/686.1 |
| 6,026,492 | * 2/2000 | Cromer et al. ......................... 713/202 |

\* cited by examiner

*Primary Examiner*—Josie A. Ballato
*Assistant Examiner*—Robert L Deberadinis
(74) *Attorney, Agent, or Firm*—Haynes and Boone, LLP

(57) ABSTRACT

A computer, or other electrical component, having an electrical switch adapted to open when the cover of the chassis of the component covers the chassis and close when the cover is removed from the chassis. A mechanism is provided that turns on, and stays turned on, in response to the closing of the switch for providing an output. An indication device is connected to the mechanism and is adapted to provide a corresponding indication when the mechanism turns on.

25 Claims, 2 Drawing Sheets

pal circuits and related devices (not shown) are provided in the chassis 12. Since these are all conventional, they will not be described in any further detail.

COMPUTER WITH A CHASSIS INTRUSION DETECTOR

BACKGROUND

This disclosure relates to a computer and, more particularly, to a computer provided with a detector that detects intrusion into the interior of the computer and provides an indication of same.

It is often desirable, for security and other reasons, for the owner, or user, of a computer, to know if someone has accessed the interior of his computer. For example, in network systems including a large number of desktop computers, various components in the chassis of the computers often have to be replaced by the systems manager. In these situations, it is desirable that the user of the computer know that someone has accessed his or her computer and made the replacements.

Also, since valuable, sensitive, and secret data can be removed from the computer by physically removing the hard drive from the computer, it is important that the user also know when an intrusion of this type has taken place.

SUMMARY

Therefore, the present disclosure is directed to a computer having a detector for detecting an intrusion into the chassis of the computer.

To this end, an embodiment of the present invention features an electrical switch adapted to open when the cover of the chassis of the computer covers the chassis and close when the cover is removed from the chassis. A mechanism is provided that turns on in response to the closing of the switch for providing an output, and an indication device is connected to the mechanism and is adapted to provide a corresponding indication when the mechanism turns on.

The embodiment provides an advantage of indicating chassis intrusion in a relatively simple manner, yet prevents overriding or clearing of an intrusion event.

DESCRIPTION OF THE PREFERRED EMBODIMENT

Figure 1:
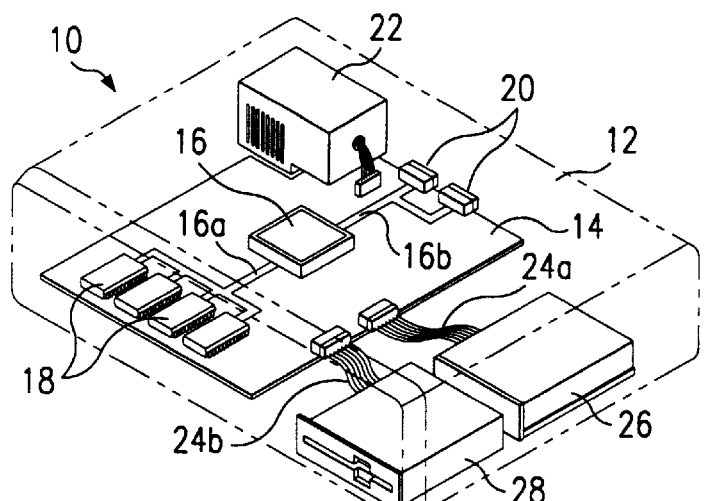
FIG. 1 is a diagrammatic view of a computer according to an embodiment of the present invention.

FIG. 1 depicts a personal computer, shown in general by the reference numeral 10, which can be in the form of a desktop computer, a laptop computer or a tower computer. The computer 10 includes a chassis 12 in which a motherboard 14 is mounted. A processor 16, a plurality of memory devices or modules 18, and two input/output (I/O) devices 20 are mounted on the motherboard 14. Two buses 16a and 16b are also provided on the motherboard 14 and connect the processor 16 to the memory modules 18 and to the input/output devices 20, respectively. A power supply 22 is connected to the motherboard 14, and a pair of cable assemblies 24a and 24b connect the motherboard to a hard drive unit 26 and a disk drive unit 28, respectively. It is understood that other components, electrical traces, electri- With reference to FIGS. 2 and 3, a cover 30 extends over the chassis 12 of the computer 10. The cover 30 is conventional, and as such, has a front wall 32 and a side wall 34. Although not shown in the drawing, it is understood that the cover 30 also includes another side wall, opposite the side wall 34, and a rear wall.

Two openings 32a and 32b are provided through the front wall 32 for receiving drive units, such as a floppy disc drive, and a CD ROM drive. A push button 36 is also provided on the front wall 32 for turning the computer 10 on and off.

Figure 2:
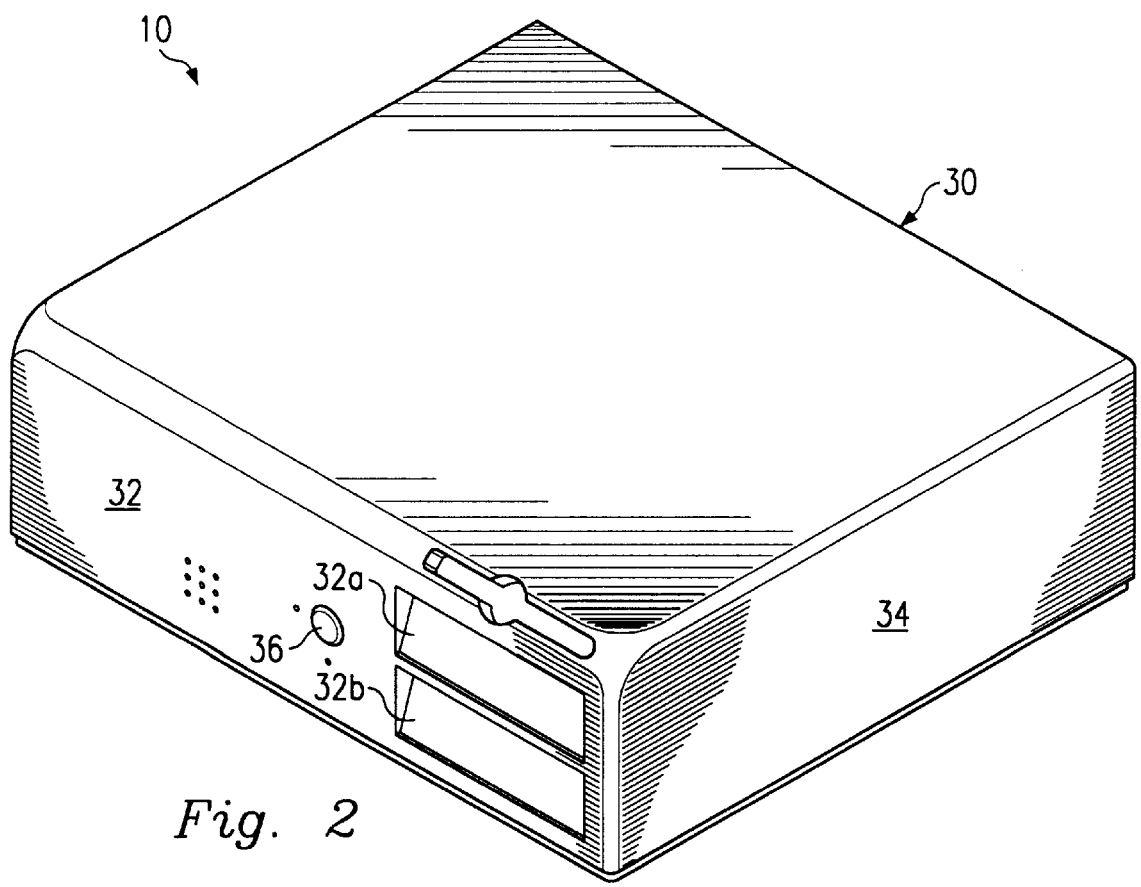
FIG. 2 is a isometric view of the embodiment of FIG. 1
Figure 3:
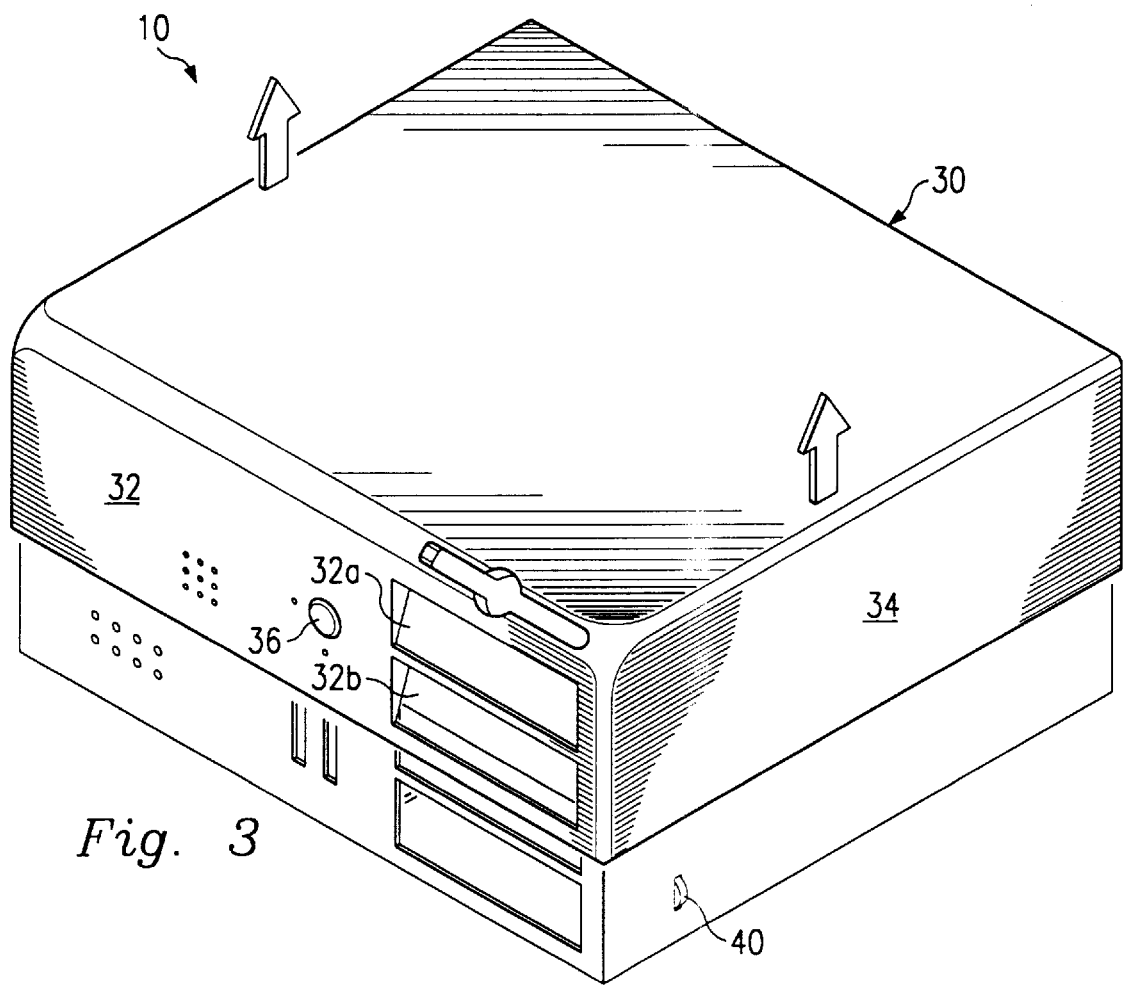
FIG. 3 is a view similar to that of FIG. 1, but depicting the embodiment of FIG. 1 with its cover in a position slightly above its normal position.

As shown in FIG. 3, a switch 40 is mounted on a side wall of the chassis 12 and is adapted to be engaged by the side wall 34 of the cover 30 when the cover is completely mounted over the chassis as shown in FIG. 2. The switch 40 is in the form of a mechanical momentary switch of a conventional design and is connected in an intrusion detector circuit shown in FIG. 4.

Figure 4:
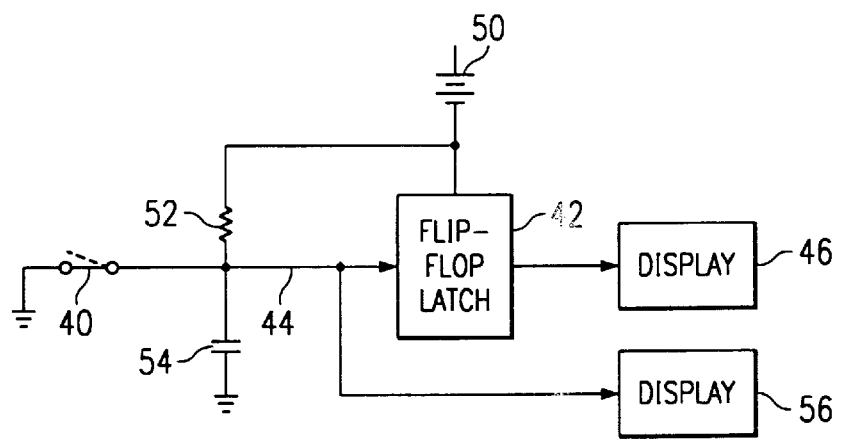
FIG. 4 is a schematic view of an intrusion indicator circuit of the embodiment of FIGS. 1–3.

With reference to FIG. 4, the latter circuit also includes a flip-flop latch mechanism 42 electrically connected to the switch 40, via a conductor 44. A display 46, for indicating chassis intrusion, is electrically connected to an output of the latch mechanism 42. The circuit of FIG. 4 is connected to the power supply 22 (FIG. 1) of the computer 10 and the latch mechanism 42 is designed to attain an off, or inactive, state when a relatively high voltage, or logic, level is present in the circuit. The latch mechanism is 42 also adapted to switch to an on, or active, state in response to this voltage level reducing to a relatively low level. Also, once the latch mechanism 42 attains an active state in response to the relatively low voltage, it will remain in its active state even if the voltage level later increases back to the relatively high level, for reasons to be explained.

A battery 50 is connected to the latch mechanism 42 to power same independently of, and as an alternate to, the power supply 22. An RC circuit, including a resistor 52 and a capacitor 54 connected in series, is connected in the circuit of FIG. 4 between the battery 50 and ground, and to the conductor 44.

A display 56 is also connected to the conductor 44 and can include a counter for providing and displaying the number of times the cover 30 has been removed from the chassis 12 and the elapsed time since the last time the cover has been removed.

It is understood that the circuit shown in FIG. 4 can be mounted in the chassis 12 and can be provided on a circuit board or the like, in a conventional manner, and that the displays 46 and 56 can be mechanically connected to the chassis 12 or to a separate, stand alone, display device (not shown).

In operation, the switch 40 is forced to a retracted, electrically-open position, shown by the dashed line in FIG. 4, by the cover 30 when the cover is assembled over the chassis 12 during normal use of the computer 10, as shown in FIG. 2. Since the circuit of FIG. 4 is electrically connected to the power supply 22 of the computer, a relatively high voltage will be normally be established in the circuit of FIG. 4 to maintain the latch mechanism in an inactive state, as discussed above.

However, when the cover 30 is removed from the chassis 12, or, more specifically, when it is lifted from the chassis to a position exposing the switch 40, the switch 40 spring biases to its extended, electrically-closed, position as shown by the solid line in FIG. 4. This causes current to flow in the circuit of FIG. 4 through the resistor 52 and the switch 40 to reduce the voltage in the circuit to a predetermined, relatively low, level, such as zero. The latch mechanism 42 responds accordingly and switches to an "on", or active, mode to activate the display 46 which provides a visual indication of chassis intrusion. This closing of the switch 40 also activates the display 56 which displays the number of times the cover 30 has been removed from the chassis 12 and the elapsed time since the removal.

When the cover is later replaced completely over the chassis 12 as shown in FIG. 2, the switch 40 is forced to a retracted, electrically open position, shown by the dashed line in FIG. 4, and the current flow through the switch is terminated. Although the voltage level across the latch mechanism 42 will thus go back to a relatively high value, the latch mechanism is designed to remain in its active, or on state, and the display 46 thus remains on. Therefore, a continuous visual indication of chassis intrusion is provided, notwithstanding replacement of the cover 30. In this context, the opening of the switch 40 causes the display 56 to turn off since the display is directly connected to the switch 40.

After the cover 30 is replaced over the chassis 12, it is understood that the latch mechanism 42 is adapted to be manually reset by the user or system manager. For example, software can be loaded into the computer 10 which enables the user or manager to reset the latch mechanism 42 to its inactive, or off, position after entering a proper password, or the like.

The circuit of FIG. 4 is designed to prevent clearance of an intrusion event by removal of the AC power to the computer 10 after the cover 30 is removed from the chassis 12. More particularly, if the AC power to the computer 10, and therefore the current from the power supply 22 to the circuit of FIG. 4, is removed, the battery 50 will supply the requisite voltage to the circuit. Thus, the above operation, including that of the latch mechanism 42, will not be interrupted or changed, even if the AC power is later restored to the computer 10.

Also, an intrusion event will not be cleared even if the intruder takes additional steps to clear the intrusion. For example, after the cover 30 is removed, if the intruder then disconnects the AC power to the computer 10 and removes the battery 50 from the circuit of FIG. 4, the latch mechanism 42 will still remain in its active, or on state since there would be no current to increase the voltage in the circuit. If the cover 30 is replaced and the AC power is then restored and/or the battery 50 is reinstalled in the circuit, the voltage in the circuit of FIG. 4 would go back up to a relatively high level consistent with the latch mechanism 42 being in its off, or inactive, mode. However this does not happen since the circuit would take a few milliseconds to charge up to its relatively high voltage level due to the presence of the RC circuit, including the resistor 52 and the capacitor 54. Therefore, immediately after the power is restored to the circuit and before the voltage in the circuit reaches the relatively high level, the latch mechanism 42 would respond to the relative low voltage level during the charging of the circuit and would therefore remain in its active, or on, state. Thus, the latch mechanism 42 would keep the display 46 on in the manner discussed above notwithstanding the fact that the voltage level in the circuit would increase to the relatively high value. This would also be true if the switch 40 is also disconnected from the motherboard 14 in a further attempt to clear an intrusion.

Thus, the circuit of FIG. 4 is easily installed in the computer 10 yet provides a reliable indication of chassis intrusion. Also, the circuit is designed to provide an indication of an intrusion event, despite the above efforts to clear the intrusion event.

It is understood that variations may be made in the foregoing without departing from the scope of the invention. For example, either one or both of the displays 46 and 56 can be adapted to provide an audible alarm either in place of, or in addition to, the visual display. Also, the switch 40 can be mounted on the cover 30, rather than the chassis 12. Further, the intrusion circuit of FIG. 4 is not limited to use with computers, but is equally applicable to other electronic components which lend themselves to intrusion detection.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer system comprising:
   a chassis;
   at least one memory disposed in the chassis;
   at least one storage disposed in the chassis;
   a cover extending over the chassis;
   an electrical circuit connected to a first power source and a second power source;
   an electrical switch connected to the circuit and adapted to open when the cover extends over the chassis, and to close when the cover is removed from the chassis;
   a latching mechanism electrically connected to the circuit for latching a voltage change indicating an intrusion state in response to the closing of the switch; and
   a dedicated display device electrically connected to the latching mechanism and adapted to provide an indication when the latching mechanism turns on.

2. The computer system of claim 1 wherein the latching mechanism remains on when the switch opens.

3. The computer system of claim 1 wherein the first power source is an AC power source.

4. The computer system of claim 3 wherein the voltage in the circuit attains a relatively high level when the switch is open, and a relatively low level when the switch closes.

5. The computer system of claim 4 wherein the latching mechanism turns off in response to the relatively high voltage in the circuit, and turns on in response to the relatively low voltage in the circuit.

6. The computer system of claim 5 wherein the second power source is a battery for providing power to the circuit when the first power source is disconnected from the circuit.

7. A computer system comprising:
   a chassis;
   at least one memory disposed in the chassis;
   at least one storage disposed in the chassis;
   a cover extending over the chassis;
   an electrical circuit connected to a first AC power source and a second battery power source;
   an electrical switch connected to the circuit and adapted to open when the cover extends over the chassis, and to close when the cover is removed from the chassis;
   a latching mechanism electrically connected to the circuit for latching a voltage change indicating an intrusion state in response to the closing of the switch, for providing an output to a display device electrically connected to the latching mechanism and adapted to provide an indication when the latching mechanism turns on; and a resistor and a capacitor connected in the circuit so that, if the AC power or the battery power source are disconnected from the circuit and then reconnected, the resistor and capacitor delay the voltage in the circuit attaining the relatively high value, thus maintaining the latching mechanism turned on.

8. A computer system comprising:
a chassis;
at least one memory disposed in the chassis;
at least one storage disposed in the chassis;
a cover extending over the chassis;
an electrical circuit connected to a first power source and a second power source;
an electrical switch connected to the circuit and adapted to open when the cover extends over the chassis, and to close when the cover is removed from the chassis; and
a latching mechanism electrically connected to the circuit for latching a voltage change indicating an intrusion state in response to the closing of the switch, for providing an output to a display device electrically connected to the latching mechanism and adapted to provide an indication when the latching mechanism turns on; and
an additional display device connected to the switch, the additional display device adapted to turn on in response to the closing of the switch and provide a corresponding indication, and to turn off in response to opening of the switch.

9. The computer system of claim 8 wherein the first-mentioned display device indicates chassis intrusions and wherein the additional display device indicates a number of intrusions and elapsed time after each intrusion.

10. An electronic component comprising:
a chassis;
a cover extending over the chassis;
an electrical circuit connected to a first power source and a second power source;
an electrical switch connected to the circuit and adapted to open when the cover extends over the chassis, and to close when the cover is removed from the chassis; and
a latching mechanism electrically connected to the circuit for indicating an intrusion state in response to the closing of the switch, for providing an output directly to a display device; and
the display device electrically connected to the latching mechanism and adapted to provide an indication when the latching mechanism turns on.

11. The component of claim 10 wherein the latching mechanism remains on when the switch opens.

12. The component of claim 10 wherein the first power source is an AC power source.

13. The component of claim 12 wherein the voltage in the circuit attains a relatively high level when the switch is open and a relatively low level when the switch closes.

14. The component of claim 13 wherein the latching mechanism turns off in response to the relatively high voltage in the circuit, and turns on in response to the relatively low voltage in the circuit.

15. The component of claim 14 wherein the second power source is a battery for providing power to the circuit when the first power source is disconnected from the circuit.

16. The component of claim 10 wherein the intrusion state is indicated when both of the power sources are connected to the circuit when at least one of the power sources is connected to the circuit, and when neither of the power sources is connected to the circuit.

17. An electronic component comprising:
a chassis;
a cover extending over the chassis;
an electrical circuit connected to a first power source and a second power source;
an electrical switch connected to the circuit and adapted to open when the cover extends over the chassis, and to close when the cover is removed from the chassis; and
a latching mechanism electrically connected to the circuit for indicating an intrusion state in response to the closing of the switch, for providing an output to a display device electrically connected to the latching mechanism and adapted to provide an indication when the latching mechanism turns on; and
an additional display device connected to the switch, the additional display device adapted to turn on in response to the closing of the switch and provide a corresponding indication, and to turn off in response to opening of the switch.

18. The component of claim 17 wherein the first-mentioned display device indicates chassis intrusion and wherein the additional display device indicates a number of intrusions and elapsed time after each intrusion.

19. A method for indicating removal of a cover from a chassis, comprising the steps of:
connecting an electrical circuit to a first power source and a second power source;
closing a switch in the circuit when the cover is removed from the chassis;
activating a latching mechanism in the circuit for latching a voltage change indicating an intrusion state in response to the step of closing;
providing an indication in response to the step of activating to a display normally hidden by the cover when the cover is not removed from the chassis; and
maintaining the indication after the switch opens when both of the power sources are connected to the circuit, when at least one of the power sources is connected to the circuit, and when neither of the power sources is connected to the circuit.

20. The method of claim 19 wherein the voltage in the circuit attains a relatively high level when there is no current flow in the circuits and a relatively low level in response to current flow in the circuit.

21. The method of claim 20 wherein the latching mechanism switches off in response to the relatively high voltage in the circuit, and switches on in response to the relatively low voltage in the circuit.

22. The method of claim 21 wherein the first power source is an AC power source and the second power source is a battery.

23. A method for indicating removal of a cover from a chassis, comprising the steps of:
connecting an electrical circuit to a first AC power source and a second battery power source;
closing a switch in the circuit when the cover is removed from the chassis;
activating a latching mechanism in the circuit for latching a voltage change indicating an intrusion state in response to the step of closing;
providing an indication in response to the step of activating;
maintaining the indication after the switch opens when both of the power sources are connected to the circuit, when at least one of the power sources is connected to the circuit, and when neither of the power sources is connected to the circuit; and connecting a resistor and a capacitor in the circuit so that if the AC power source and/or the battery power source are disconnected from the circuit and then connected, the resistor and capacitor delay the voltage in the circuit attaining the relatively high value thus maintaining the latching mechanism turned on.

24. A method for indicating removal of a cover from a chassis, comprising the steps of:

connecting an electrical circuit to a first power source and a second power source;

closing a switch in the circuit when the cover is removed from the chassis;

activating a latching mechanism in the circuit for latching a voltage change indicating an intrusion state in response to the step of closing;

providing an indication in response to the step of activating;

maintaining the indication after the switch opens when both of the power sources are connected to the circuit, when at least one of the power sources is connected to the circuit, and when neither of the power sources is connected to the circuit; and providing an additional indication in response to the step of activating.

25. The method of claim 24 where the first-mentioned step of indicating indicates chassis intrusion and wherein the additional step of indicating indicates elapsed time since the intrusion.

* * * * *